United States Patent

Ramos et al.

(10) Patent No.: US 10,086,735 B2
(45) Date of Patent: Oct. 2, 2018

(54) CUP HOLDER ASSEMBLY

(71) Applicant: FORD GLOBAL TECHNOLOGIES, LLC, Dearborn, MI (US)

(72) Inventors: Erick Ramos, Ciudad de Mexico (MX); Rodolfo Omar Calderon, Ciudad de Mexico (MX); Claudia Cruz, Cuautitlan Izcalli (MX); Jocelyn Moctezuma, Cuautitlan (MX); Ricardo Zavala, Pachuca (MX)

(73) Assignee: Ford Global Technologies, LLC, Dearborn, MI (US)

( * ) Notice: Subject to any disclaimer, the term of this patent is extended or adjusted under 35 U.S.C. 154(b) by 56 days.

(21) Appl. No.: 15/364,655

(22) Filed: Nov. 30, 2016

(65) Prior Publication Data

US 2018/0147967 A1    May 31, 2018

(51) Int. Cl.
*B60N 3/10* (2006.01)
*B60R 16/037* (2006.01)

(52) U.S. Cl.
CPC ............. *B60N 3/10* (2013.01); *B60R 16/037* (2013.01)

(58) Field of Classification Search
CPC ........................................................ B60N 3/10
USPC ..................................................... 296/24.34
See application file for complete search history.

(56) References Cited

U.S. PATENT DOCUMENTS

| | | | | |
|---|---|---|---|---|
| 2,099,122 A * | 11/1937 | Kreisler | ................ | A45C 13/16 132/303 |
| 4,854,632 A * | 8/1989 | Kreuze | .................... | B60R 7/06 160/201 |
| 7,104,609 B2 | 9/2006 | Kim | | |
| 7,794,000 B2 * | 9/2010 | Ichimaru | ................... | B60R 7/04 248/311.2 |
| 8,480,151 B2 * | 7/2013 | Gaudig | ................. | B60N 3/105 296/24.34 |
| 8,528,956 B1 * | 9/2013 | Winiger | .................... | B60R 7/04 296/24.34 |
| 2005/0189776 A1 * | 9/2005 | Sturt | ...................... | B60N 3/102 296/24.34 |
| 2011/0115246 A1 * | 5/2011 | Beyer | .................... | B60N 2/773 296/24.34 |
| 2015/0353019 A1 | 12/2015 | Skapof et al. | | |
| 2017/0332816 A1 * | 11/2017 | Patil | ................... | A47G 23/0225 |

FOREIGN PATENT DOCUMENTS

| | | | | |
|---|---|---|---|---|
| EP | 1752333 A2 * | 2/2007 | ............... | B60N 3/10 |
| KR | 19970038573 A | 7/1997 | | |
| KR | 19980043666 U | 9/1998 | | |

* cited by examiner

*Primary Examiner* — Jason S Morrow
(74) *Attorney, Agent, or Firm* — Vichit Chea; Brooks Kushman P.C.

(57) ABSTRACT

A cup holder assembly includes a console with an opening, a cup holder movable within the opening between front and rear positions, and a flexible band. The flexible band is connected to front and rear ends of the cup holder such that the cup holder and band together extend to a length of the opening when the cup holder is in at least one of the front and rear positions.

14 Claims, 4 Drawing Sheets

CUP HOLDER ASSEMBLY

TECHNICAL FIELD

The present disclosure relates to cup holder assemblies for motor vehicles.

BACKGROUND

Motor vehicles may include cup holders that provide storage areas for beverages. The cup holders may be built into, or attached to, one or more interior components of the vehicle. It may be desirable to have an adjustable cup holder to accommodate vehicle occupants having varying heights.

SUMMARY

According to one embodiment, a cup holder assembly includes a console with an opening, a cup holder movable within the opening between a front and a rear position, and a flexible band. The flexible band is connected to a front and a rear end of the cup holder such that the cup holder and band together extend to a length of the opening when the cup holder is in at least one of the front and rear positions.

According to another embodiment, a cup holder assembly includes a console with an opening, a cup holder movable between first and second positions within the opening, and a band extending from a first end of the cup holder to a second end of the cup holder to form a loop such that movement of the band along a band path effects movement of the cup holder between the first and second positions.

According to another embodiment, a cup holder assembly includes a console with an opening, a cup holder movable between a first and second position within the opening, a band coupled to the cup holder, and a first spool coupled to the band such that the band spools around the first spool when the cup holder moves from one of the first and second positions to the other of the first and second positions.

DETAILED DESCRIPTION

As required, detailed embodiments of the present disclosure are disclosed herein; however, it is to be understood that the disclosed embodiments are merely exemplary of the disclosure that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present disclosure.

Figure 1:
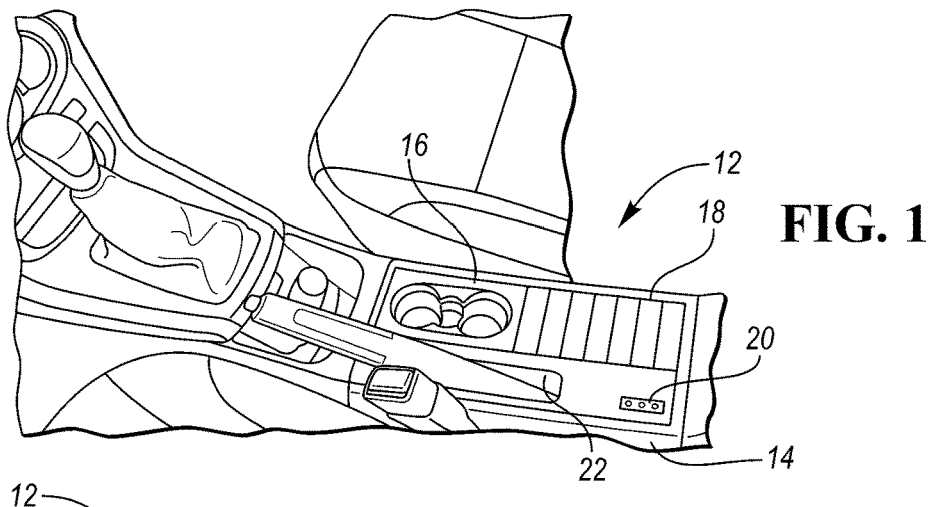
FIG. 1 is a perspective view of an interior of a vehicle with a cup holder assembly in accordance with one embodiment.

FIG. 1 is a perspective view of an interior of a vehicle 10 with a cup holder assembly 12 in accordance with one embodiment. Assembly 12 may include a console 14, a cup holder 16, a flexible band 18, and a user interface 20 disposed on console 14. Console 14 may include a hole 22 through which a parking brake may project and be accessible to the driver and an opening 24 (FIG. 9) through which cup holder 16 may move. Cup holder 16 may comprise one recess or more than one recess in which cups, beverages, or other storage items may be selectively disposed. Although the illustrated embodiments show three recesses for storing containers of varying sizes, one of ordinary sill in the art will understand that cup holder 16 and its recess(es) and storage compartment(s) may be of any shape or form. For example and without limitation, cup holder 16 may include cylindrical recesses to store cups and rectangular or square recesses to store items such as coins or telephones.

In one embodiment, cup holder 16 may be movable within opening 24 between a front position and a rear position. Cup holder 16 is shown in the front position in FIG. 1. The front position may be desirable for an occupant who prefers the vehicle seat to be positioned more forward toward the dashboard (for example, if the occupant is relatively short in height). The rear position may be desirable for an occupant who prefers the vehicle seat to be positioned more rearward (for example, if the occupant is relatively tall in height). Although assembly 12 is illustrated as being disposed between the driver and passenger seats, the assembly may be disposed in other locations within the vehicle in accordance with other embodiments of the disclosure.

Figure 2:
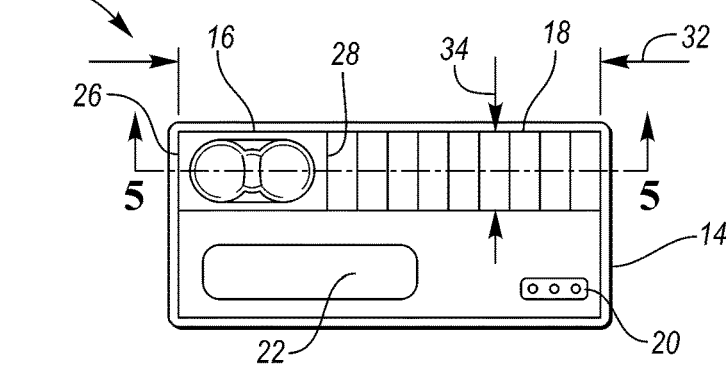
FIG. 2 is a top plan view of the cup holder assembly of FIG. 1 in a front position.
Figure 3:
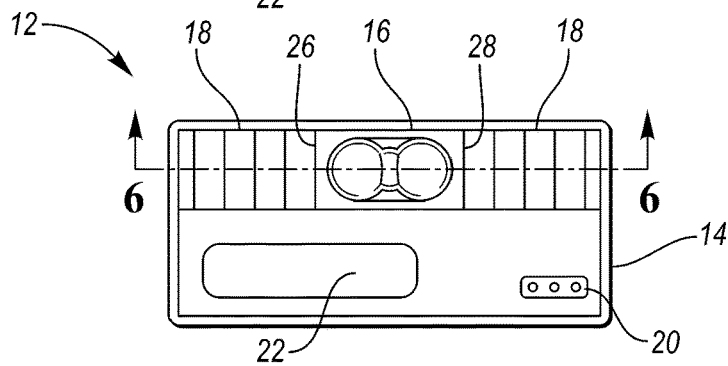
FIG. 3 is a top plan view of the cup holder assembly of FIG. 1 in a middle position.
Figure 4:
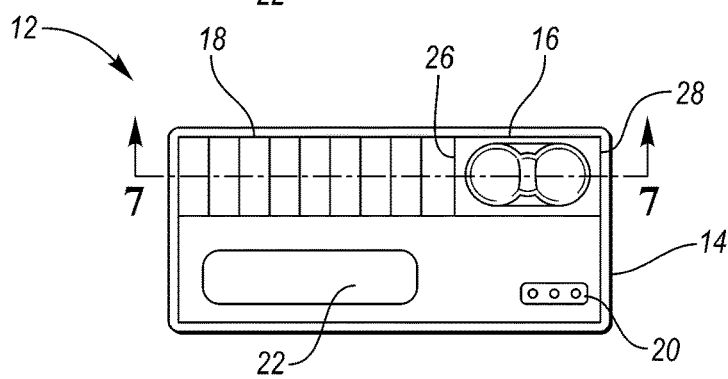
FIG. 4 is a top plan view of the cup holder assembly of FIG. 1 in a rear position.
Figure 5:
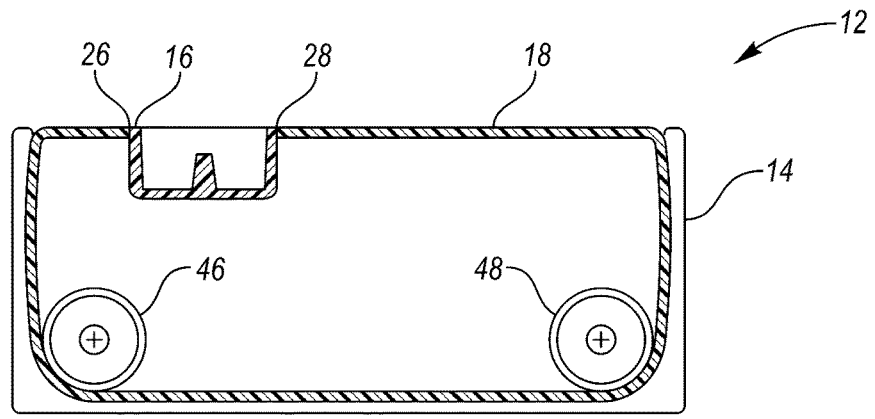
FIG. 5 is a cross-sectional view of the cup holder assembly taken along line 5-5 of FIG. 2.
Figure 6:
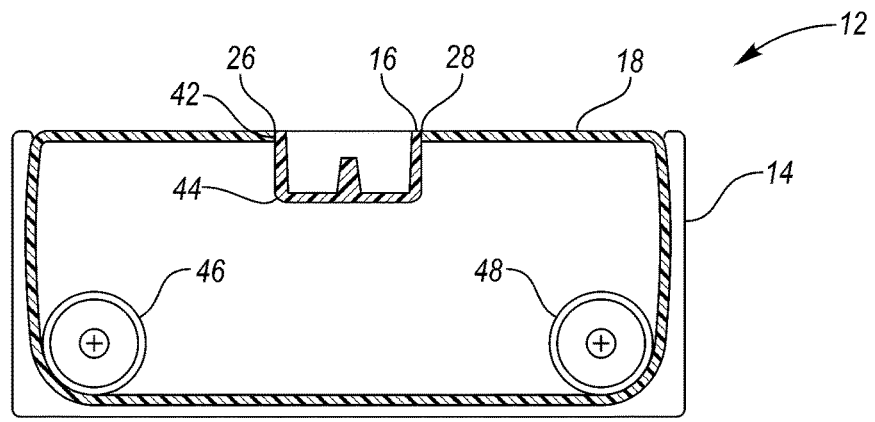
FIG. 6 is a cross-sectional view of the cup holder assembly taken along line 6-6 of FIG. 3.
Figure 7:
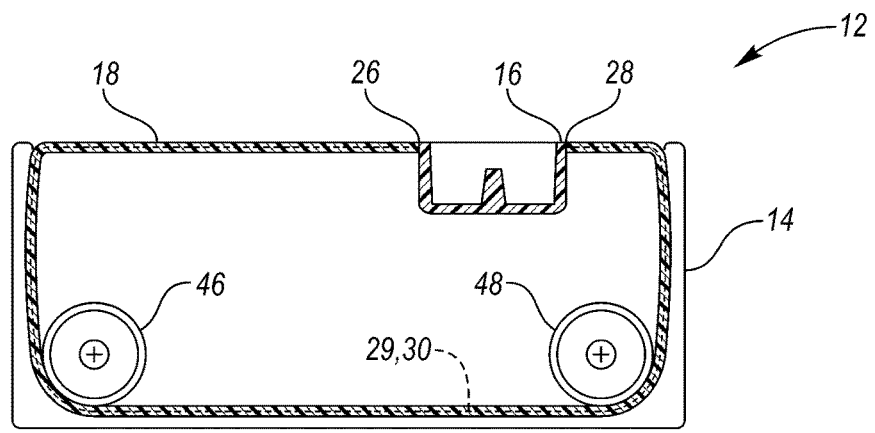
FIG. 7 is a cross-sectional view of the cup holder assembly taken along line 7-7 of FIG. 4.

FIG. 2 is a top plan view of the cup holder assembly 12 of FIG. 1 in the front position. FIG. 3 is a top plan view of assembly 12 in a middle position. FIG. 4 is a top plan view of assembly 12 in the rear position. FIGS. 5-7 are cross-sectional views (from FIGS. 2-4, respectively). As illustrated, band 18 may extend from a front end 26 of cup holder 16 to a rear end 28 of cup holder 16 to form a loop 29 such that movement of band 18 along a band path 30 effects movement of cup holder 16 between the front and rear positions (loop 29 and band path 30 depicted as a dashed line in FIG. 7). The band path 30 may be the outline or profile of the band 17 as positioned within assembly 12. Band 18 may be connected to front end 26 and rear end 28 of cup holder 16 such that cup holder 16 and band 18 together extend to a length 32 (FIG. 2) of opening 24 when cup holder 16 is in at least one of the front and rear positions. In one embodiment, cup holder 16 and band 18 are configured to extend to length 32 when cup holder 16 is in the front and rear positions. Moreover, in one embodiment, a width 34

(FIG. 2) of band 18 may be greater than or equal to a width 36 (FIG. 9) of opening 24 such that opening 24 is covered by cup holder 16 and band 18 when cup holder 16 moves between the front and rear positions. One of ordinary skill in the art will understand, however, that the width 34 of the band 18 may be less than the width 36 of opening 24 and partially cover opening 24 or not cover the opening 24 at all. For example and without limitation, the band 18 may be hidden within console 14 proximate to sides 38, 40 (FIG. 9) of opening 24. In the illustrated embodiment, band 18 is coupled to a top portion 42 (FIG. 6) of cup holder 16. In other embodiments, band 18 may be coupled to another portion of cup holder 16. For example and without limitation, band 18 may be coupled to a bottom portion 44 (FIG. 6) of cup holder 16.

Referring to FIGS. 5-7, assembly may further include rotating members 46, 48 engaged with band 18 such that rotation of rotating members 46, 48 causes band 18 to move. In one embodiment, rotating members 46, 48 may define the band path 30 and be coupled to band 18 such that rotation of rotating members 46, 48 causes band 18 to move along band path 30. In the illustrated embodiment, rotating members 46, 48 may be rollers that are driven in by a power source, such as a rotary motor (as described in more detail below). In other embodiments, however, rotating members 46, 48 may be power sources themselves or rotating member 46 may be a power source and rotating member 48 may be a roller (or vice versa). Furthermore, although the illustrated embodiment includes two rotating members 46, 48, one of ordinary skill in the art will understand that there may be less than or more than two rotating members disposed within or outside the loop 29 within the spirit and scope of the disclosure. In some embodiments, there may be no rotating members. For example and without limitation, band 18 may be supported by stationary arcuate member(s). Moreover, in some embodiments, the power source that allows movement of the cup holder 16 within opening 24 may be the user or occupant of the vehicle (i.e., manual movement of cup holder 16).

Figure 8A:
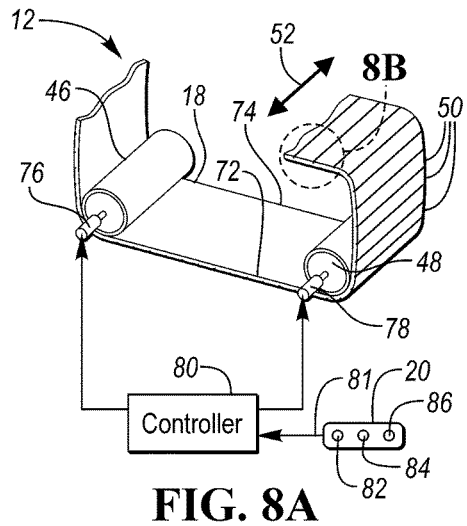
FIG. 8A is a partial schematic view of the cup holder assembly of FIG. 1.
Figure 8B:
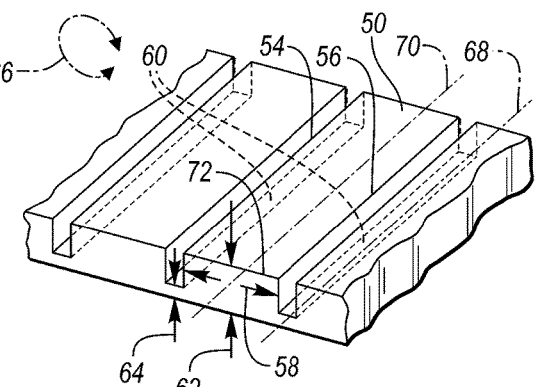
FIG. 8B is a side close-up view taken from FIG. 8A.

FIG. 8A is a partial schematic view of the cup holder assembly 12 of FIG. 1. FIG. 8B is a side close-up view taken from FIG. 8A. In the illustrated embodiment, band 18 comprises a plurality of tambour slats 50 that extend in a lateral direction 52, and each of the slats 50 has opposite longitudinal edges 54, 56 hingedly connected to neighboring slats relative to opposite longitudinal edges 54, 56. Slats 50 may have any number of widths (same or differing). In one embodiment, each slat 50 has a width 58 of 20.0 to 25.0 millimeters. The longitudinal edges 54, 56 of slats 50 may be hingedly connected to neighboring slats in various ways. For example and without limitation, band 18 may include plurality of slats 50 and a plurality of intermediary portions 60, and each slat 50 may be hingedly connected to neighboring slats through intermediary portions 60. Band 18 may be comprised of rubber, and each slat 50 may have a height 62 greater than a height 64 of intermediary portion 60 such that a degree of flexibility in a rotational direction 66 of intermediary portion 60 (relative to a central longitudinal axis 68 of intermediary portion 60) is greater than a degree of flexibility in the rotational direction 66 of slat 50 (relative to a central longitudinal axis 70 of slat 50). In one embodiment, height 62 may 3.5 to 4.0 millimeters, and height 64 may be 1.0 to 1.5 millimeters. Moreover, intermediary portions 60 may each have a width (measured between longitudinal edges 54, 56 of neighboring slats 50) of 1.0 to 1.5 millimeters. The various dimensions of slats 50 and intermediary portions 60 may be selected to provide a band 18 with the appropriate degree of flexibility.

In another embodiment, the slats may be spaced apart and adhered to a flexible mesh sheet such that the areas in between the slats (i.e., mesh) have a greater degree of flexibility than that of the slats (relative to their respective central longitudinal axes). In yet another embodiment, the slats may be hingedly connected by threading a wire or thread in and around each slat proximate the lateral ends 72, 74 (FIG. 8A) of the slats. Although the slats 50 and intermediary portions 60 are described as being uniform, one of ordinary skill in the art will understand that the slats and intermediary portions may be non-uniform. For example and without limitation, the width of the slats and/or the intermediary portions may depend on the degree of flexibility desired for the specific application. A greater degree of flexibility may be desired in areas of the band 18 that travel in areas of the band path 30 that are arcuate or include sharp turns. Furthermore, although band 18 is illustrated as including slats, one of ordinary skill in the art will understand that band 18 may not include slats and, for example and without limitation, have one height (from inner diameter to outer diameter).

Referring to FIG. 8A, assembly 12 may further comprise motors 76, 78 configured to rotate rotating members 46, 48, respectively. Motors 76, 78 may be rotary motors with shafts splined with rotating members 46, 48 such that rotation of motors 76, 78 causes rotation of rotating members 46, 48, respectively. One of ordinary skill in the art will understand that there are a number of ways to effect rotation of the rotating members 46, 48. For example and without limitation, assembly 12 may further include gears to increase the torque. Furthermore, the rotational axes of the motors 76, 78 and of the rotating members 46, 48 may or may not be coaxial. In addition, band 18 may travel along band path 30 (FIG. 7) without rotating members 46, 48. For example and without limitation, assembly 12 may include a lead screw coupled to the band 18 to convert rotational motion to linear motion.

Still referring to FIG. 8A, assembly 12 may further comprise user interface 20 and at least one controller 80. User interface 20 may be configured to send a signal 81 indicative of a desired position of cup holder 16 to controller 80 upon receipt of an input from a user. User interface 20 may include buttons 82, 84, 86, switches, or include a touch-pad upon which the user may input the desired position. Each button 82, 84, 86 may represent a different position of cup holder 16. One of ordinary skill in the art will understand, however, that user interface 20 may take a variety of forms and allow the user to choose multiple different positions of the cup holder 16. In the illustrated embodiment, user interface 20 is disposed on console 14 (see FIG. 2). In other embodiments, however, the user interface 20 may be disposed in other areas within interior of vehicle 10 (for example and without limitation, on the instrument panel). Controller 80 may be configured to in response to receipt of the signal 81 indicative of a desired position of the cup holder 16, command motor 76 and/or 78 to rotate such that the corresponding rotation of the rotating member 46 and/or 48 causes the cup holder 16 to move to the desired position.

Figure 9:
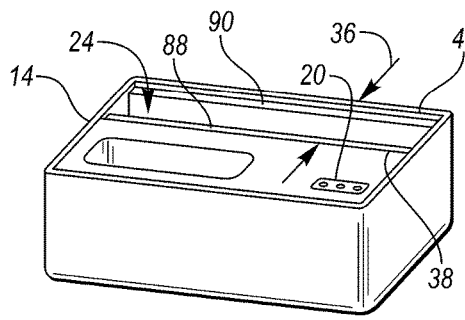
FIG. 9 is a perspective view of a console of the cup holder assembly of FIG. 1.

FIG. 9 is a perspective view of console 14 of assembly 12 (with cup holder 16 and band 18 removed). As illustrated, console 14 may include tracks 88, 90 on sides 38, 40, respectively, of opening 24 to define band path 30 (FIG. 7) and support cup holder 16 between the front and rear positions. Tracks 88, 90 may support lateral ends 72, 74

(FIG. 8A) of at least a portion of band 18 as band 18 moves along band path 30. Although tracks 88, 90 are illustrated as being a flat surface, the tracks may include a groove through which a pin on an underside of band 18 may travel. The tracks may also include a plurality of rollers and/or be comprised of a material with a relatively low coefficient of friction to allow smooth travel of band 18 and/or cup holder 16 along band path 30. Furthermore, although in the illustrated embodiment, both band 18 and cup holder 16 make contact with tracks 88, 90 as cup holder 16 moves between the front and rear positions, either band 18 or cup holder 16 may make contact with tracks. In some embodiments, the tracks may include stops that project from the tracks to prevent further movement of cup holder 16. One of ordinary skill in the art will understand that cup holder 16 and band 18 may be supported by other elements (illustrated or not) as cup holder 16 moves between the front and rear positions.

Figure 10B:
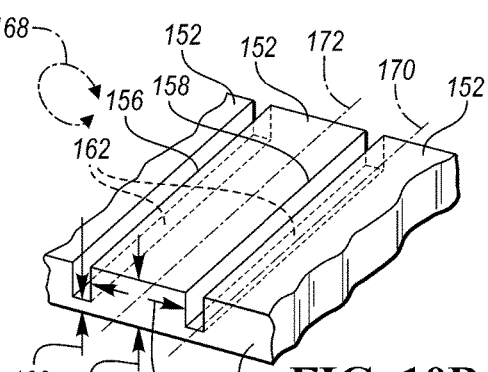
FIG. 10B is a side close-up view taken from FIG. 10A.
Figure 10A:
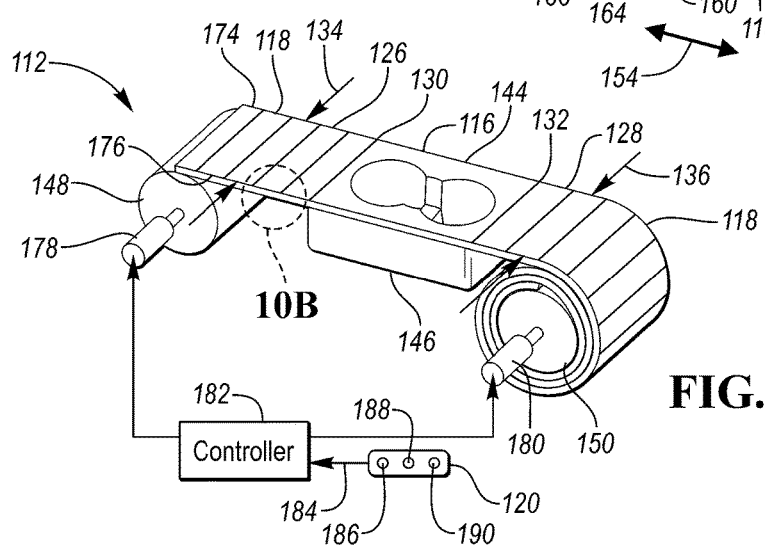
FIG. 10A is a schematic view of a cup holder assembly in accordance with another embodiment.
Figure 11:
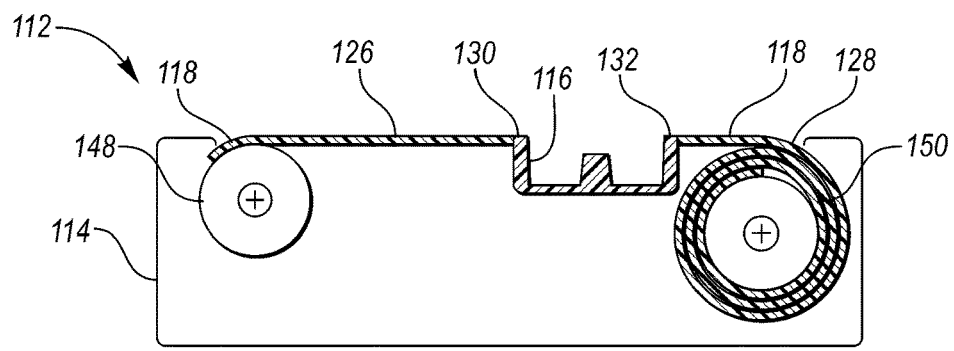
FIG. 11 is a side schematic view of the cup holder assembly of FIG. 10A in a rear position.
Figure 12:
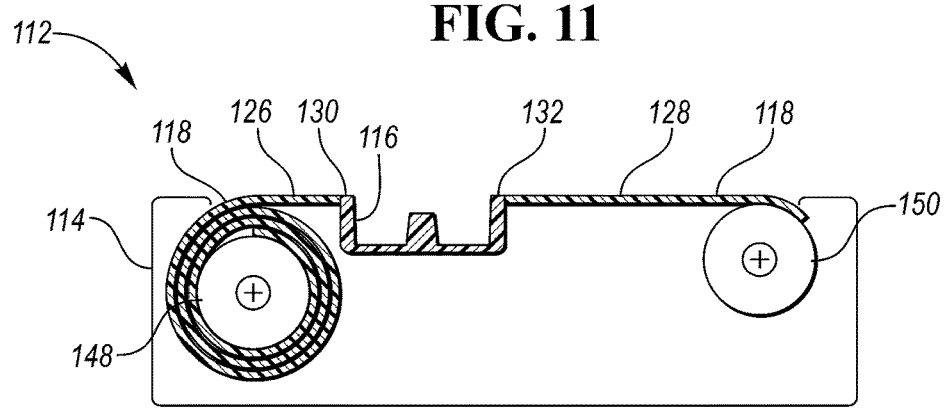
FIG. 12 is a side schematic view of the cup holder assembly of FIG. 10A in a front position.
Figure 13:
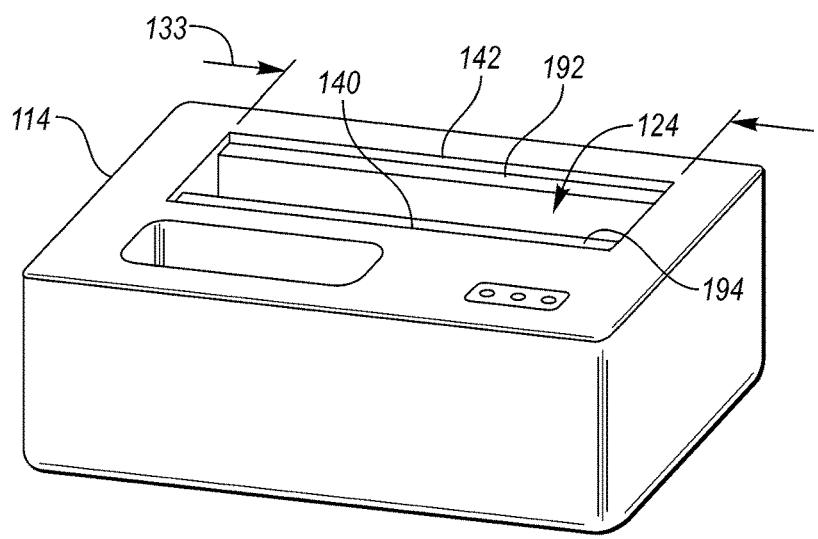
FIG. 13 is a perspective view of a console of the cup holder assembly of FIG. 10A.

FIG. 10A is a schematic view of a cup holder assembly 112 in a rear position in accordance with another embodiment, and FIG. 10B is a side close-up view taken from FIG. 10A. FIG. 11 is a side schematic view of assembly 112 in the rear position, and FIG. 12 is a side schematic view of assembly 112 in a front position. FIG. 13 is a perspective view of a console 114 of assembly 112. Referring to FIG. 10A, assembly 112 may include a console 114, a cup holder 116, a flexible band 118, and a user interface 120 disposed on console 114. Console 114 may include an opening 124 (FIG. 13) through which cup holder 116 may move. Cup holder 116 may comprise one recess or more than one recess in which cups, beverages, or other storage items may be selectively disposed. Although the illustrated embodiments show three recesses for storing containers of varying sizes, one of ordinary sill in the art will understand that cup holder 116 and its recess(es) and storage compartment(s) may be of any shape or form. For example and without limitation, cup holder 116 may include cylindrical recesses to store cups and rectangular or square recesses to store items such as coins or telephones.

In one embodiment, cup holder 116 may be movable within opening 124 between a front position and a rear position. As illustrated, band 118 may be coupled to cup holder 116 and may include a front portion 126 and a rear portion 128. Front portion 126 of band 118 may be coupled to a front end 130 of cup holder 116, and rear portion 128 of band 118 may be coupled to a rear end 132 of cup holder 116. Band 118 may be connected to front end 130 and rear end 132 of cup holder 116 such that cup holder 116 and band 118 (front portion 126 and/or rear portion 128) together extend to a length 133 (FIG. 13) of opening 124 when cup holder 116 is in at least one of the front and rear positions. In one embodiment, cup holder 116 and band 118 (front portion 126 and/or rear portion 128) are configured to extend to length 133 when cup holder 116 is in the front and rear positions.

Referring to FIG. 10A, in one embodiment, a width 134 of front portion 126 and a width 136 of rear portion 128 of band 118 may be greater than or equal to a width 138 (shown in FIG. 13) of opening 124 such that opening 124 is covered by cup holder 116 and band 118 when cup holder 116 moves between the front and rear positions. One of ordinary skill in the art will understand, however, that the widths of the band 118 may be less than the width of opening 124 and partially cover opening 124 or not cover the opening 124 at all. For example and without limitation, the band may be hidden within console 114 proximate to sides 140, 142 of opening 124. Referring to FIG. 10, in the illustrated embodiment, band 118 is coupled to a top portion 144 of cup holder 116.

In other embodiments, the band may be coupled to another portion(s) of cup holder 116. For example and without limitation, the band may be coupled to a bottom portion 146 of cup holder 116.

Assembly 112 may further include spools 148, 150 coupled to band 118 such that band 118 spools around one of spools 148, 150 when cup holder 116 moves from one of the front and rear positions to the other of the front and rear positions. In one embodiment, front portion 126 of band 118 spools around spool 148 when cup holder 116 moves from the rear position to the front position (shown in FIG. 12), and rear portion 128 of band 118 spools around spool 150 when cup holder 116 moves from the front position to the rear position (shown in FIG. 11). In the illustrated embodiment, spools 148, 150 may be rollers that are driven by a power source, such as a rotary motor (as described in more detail below). In other embodiments, however, spools 148, 150 may be power sources themselves or spool 148 may be a power source and spool 150 may be a roller (or vice versa). Furthermore, although the illustrated embodiment includes two spools 148, 150, one of ordinary skill in the art will understand that there may be one spool and one portion (front or rear) of the band. Moreover, in some embodiments, the power source that allows movement of the cup holder 116 within opening 124 may be the user or occupant of the vehicle (i.e., manual movement of cup holder 116). Spools 148, 150 may be rotatably mounted to allow rotation relative to their respective longitudinal axes. In one embodiment, spools 148, 150 may also be mounted to allow movement of the spools in the vertical direction as band 18 is spooled around spools 148, 150 (to compensate with the increased diameter). For example, referring to FIG. 11, when rear portion 128 of band 118 is spooled around spool 150, spool 150 may lower slightly to compensate for the increased diameter of portion 128 of band 118 around spool 150. Referring to FIG. 12, when front portion 126 of band 118 is spooled around spool 148, spool 148 may lower slightly to compensate for the increased diameter of portion 126 of band 118 around spool 148. Spools 148, 150 may be biased upward such that the spools 148, 150 will gradually return to the uppermost position upon unspooling.

Referring to FIG. 10B, in the illustrated embodiment, band 118 comprises a plurality of tambour slats 152 that extend in a lateral direction 154, and each of the slats 152 has opposite longitudinal edges 156, 158 hingedly connected to neighboring slats relative to opposite longitudinal edges 156, 158. Slats 152 may have any number of widths (same or differing). In one embodiment, each slat 152 has a width 160 of 20.0 to 25.0 millimeters. The longitudinal edges 156, 158 of slats 152 may be hingedly connected to neighboring slats in various ways. For example and without limitation, band 118 may include plurality of slats and a plurality of intermediary portions 162, and each slat 152 may be hingedly connected to neighboring slats through intermediary portions 162. Band 118 may be comprised of rubber, and each slat 152 may have a height 164 greater than a height 166 of intermediary portion 162 such that a degree of flexibility in a rotational direction 168 of intermediary portion 162 (relative to a central longitudinal axis 170 of intermediary portion 162) is greater than a degree of flexibility in the rotational direction 168 of slat 152 (relative to a central longitudinal axis 172 of slat 152). In one embodiment, height 164 may 3.0 to 3.5 millimeters, and height 166 may be 1.0 to 1.2 millimeters. Moreover, intermediary portions 60 may each have a width (measured between longitudinal edges 156, 158 of neighboring slats 152) of 1.0 to 1.5 millimeters. The various dimensions of slats 152 and intermediary portions 162 may be selected to provide a band 118 with the appropriate degree of flexibility.

In another embodiment, the slats may be spaced apart and adhered to a flexible mesh sheet such that the areas in between the slats (i.e., mesh) have a greater degree of flexibility than that of the slats (relative to their respective central longitudinal axes). In yet another embodiment, the slats may be hingedly connected by threading a wire or thread in and around each slat proximate lateral ends 174, 176 of the slats 152. Although the slats 152 and intermediary portions 162 are described as being uniform, one of ordinary skill in the art will understand that the slats and intermediary portions may be non-uniform. For example and without limitation, the width of the slats and/or the intermediary portions may depend on the degree of flexibility desired for the specific application. A greater degree of flexibility may be desired for applications with a spool having a relatively small diameter, whereas a lesser degree of flexibility may be desired for applications with a spool having a relatively large diameter. Furthermore, although band 18 is illustrated as including slats, one of ordinary skill in the art will understand that band 18 may not include slats and, for example and without limitation, have one height (from inner diameter to outer diameter).

Referring to FIG. 10A, assembly 112 may further comprise motors 178, 180 configured to drive spools 148, 150, respectively. Motors 178, 180 may be rotary motors with shafts splined with spools 148, 150 such that rotation of motors 178, 180 causes rotation of spools 148, 150, respectively. One of ordinary skill in the art will understand that there are a number of ways to effect rotation of the spools 148, 150. For example and without limitation, the assembly may further include gears to increase the torque. Furthermore, the rotational axes of the motors and the spools may or may not be coaxial. In addition, the band may spool around spools without driving the spools in a rotational manner. For example and without limitation, the assembly may include a lead screw coupled to cup holder 116 to convert rotational motion to linear motion of cup holder 116 (i.e., the cup holder is driven rather than the band).

Still referring to FIG. 10A, assembly 112 may further comprise user interface 120 and at least one controller 182. User interface 120 may be configured to send a signal 184 indicative of a desired position of cup holder 116 to controller 182 upon receipt of an input from a user. User interface 120 may include buttons 186, 188, 190, switches, or include a touch-pad upon which the user may input the desired position. Each button 186, 188, 190 may represent a different position of cup holder 116. One of ordinary skill in the art will understand, however, that user interface 120 may take a variety of forms and allow the user to choose multiple different positions of the cup holder 116. In the illustrated embodiment, user interface 120 is disposed on console 114 (see FIG. 13). In other embodiments, however, the user interface may be disposed in other areas within interior of the vehicle (for example and without limitation, on the instrument panel). Controller 182 may be configured to in response to receipt of the signal 184 indicative of a desired position of the cup holder 116, command motor 178 and/or 180 to rotate such that the corresponding rotation of the spool 148 and/or 150 causes the cup holder 116 to move to the desired position.

Console 114 may be similar in shape of console 14 of assembly 12, as shown in FIG. 9. As such, console 114 may include tracks 192, 194 (similar to tracks 88, 90 discussed above) on the sides 140, 142 of the opening 124 to define support cup holder 116 between the front and rear positions.

As discussed hereinabove, the tracks 192, 194 may support lateral ends 174, 176 (FIG. 10A) of at least some slats 152 of band 118 as band 118 moves. The discussion of console 14 hereinabove with respect to assembly 12 may also apply to console 114 with respect to assembly 112.

Any of the above-mentioned controllers may further include a microprocessor or central processing unit (CPU) in communication with various types of computer readable storage devices or media. Computer readable storage devices or media may include volatile and nonvolatile storage in read-only memory (ROM), random-access memory (RAM), and keep-alive memory (KAM), for example. KAM is a persistent or non-volatile memory that may be used to store various operating variables while the CPU is powered down. Computer-readable storage devices or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller in controlling the engine or vehicle.

While exemplary embodiments are described above, it is not intended that these embodiments describe all possible forms of the disclosure. Rather, the words used in the specification are words of description rather than limitation, and it is understood that various changes may be made without departing from the spirit and scope of the disclosure. Additionally, the features of various implementing embodiments may be combined to form further embodiments of the disclosure.

What is claimed is:

1. An assembly comprising:
a cup holder disposed within a console opening between front and rear positions;
a band, movable via a motor engaged with a rotating member, connected to cup holder ends, that extends across the opening when the cup holder is in either of the positions; and
a controller configured to, responsive to receipt of a desired position between the positions, activate the motor such that the cup holder moves to the desired position.

2. The cup holder assembly of claim 1, wherein a width of the band is greater than or equal to a width of the opening such that the opening is covered by the cup holder and the band when the cup holder moves between the front and rear positions.

3. The cup holder assembly of claim 1, wherein the cup holder and band are configured to extend to the length of the opening when the cup holder is in the front and rear positions.

4. The cup holder assembly of claim 1, wherein the band includes front and rear portions coupled to the front and rear ends of the cup holder, respectively.

5. The cup holder assembly of claim 1, wherein the band forms a loop with the cup holder.

6. The cup holder assembly of claim 1, wherein the band comprises a plurality of tambour slats that extend in a lateral direction, and wherein each of the slats has opposite longitudinal edges hingedly connected to neighboring slats relative to the opposite longitudinal edges.

7. The cup holder assembly of claim 1, further comprising a user interface configured to send the signal to the at least one controller upon receipt of an input from a user.

8. A cup holder comprising:
a console with an opening;
a holder movable between a first and second position within the opening; and
a band extending from a first end of the holder to a second end of the holder to form a loop such that movement of the band along a band path effects movement of the holder between the first and second positions;
a rotating member defining the band path and coupled to the band such that rotation of the rotating member causes the band to move along the band path;
a motor configured to rotate the rotating member; and
a controller configured to in response to receipt of a signal indicative of a desired position of the holder, command the motor to rotate such that a corresponding rotation of the rotating member causes the holder to move to the desired position.

9. The cup holder of claim 8, wherein the console further includes first and second tracks on first and second sides of the opening to define the band path and support the holder between the first and second positions.

10. The cup holder of claim 8, wherein the opening is covered by the holder and the band when the holder moves between the first and second positions.

11. The cup holder of claim 8, wherein the band comprises a plurality of tambour slats that extend in a lateral direction, and wherein each of the slats has opposite longitudinal edges hingedly connected to neighboring slats relative to the opposite longitudinal edges.

12. A cup holder assembly comprising:
a console with an opening;
a cup holder movable between a first and second position within the opening;
a band coupled to the cup holder;
a first spool coupled to the band such that the band spools around the first spool when the cup holder moves from one of the first and second positions to the other of the first and second positions; and
at least one controller configured to, in response to receipt of a signal indicative of a desired position of the cup holder, command a motor to rotate the first spool such that rotation of the first spool causes the cup holder to move to the desired position.

13. The cup holder assembly of claim 12, wherein the band includes front and rear portions coupled to a front and rear end of the cup holder, respectively.

14. The cup holder assembly of claim 13, further comprising a second spool, wherein the front portion of the band is coupled to the first spool, and wherein the rear portion of the band is coupled to the second spool.

* * * * *